Patented Sept. 21, 1943

2,330,145

UNITED STATES PATENT OFFICE 2,330,145

METHOD OF SEALING PORES IN SUBTERRANEAN FORMATIONS CONTIGUOUS TO DEEP WELL BORES

Hans A. Reimers, Midland, Mich., assignor to The Dow Chemical Company, Midland, Mich., a corporation of Michigan Application August 2, 1940, Serial No. 349,596

2 Claims. (Cl. 166—22)

The invention relates to methods of treating subterranean formations penetrated by the bore of an oil or gas well, whereby the pore spaces therein may be sealed.

A particular object of the invention is to provide a method of preventing infiltration of brine or water into oil or gas wells from the formations penetrated by the well bore. Other objects and advantages will become apparent as the description of the invention proceeds, reference being made to the accompanying drawings.

I have discovered that by suitably compounding an aqueous solution containing both an alkali metal silicate and an acid sulphate, a sealing solution is obtained which can be injected into the formations contiguous to the bore of a deep well, and a predeterminable time after injection into the formation changes to a firm gel spontaneously in situ producing with the formation a fluid-impermeable mass which is substantially unaffected by oil, water, brine or gas.

Figure 1:
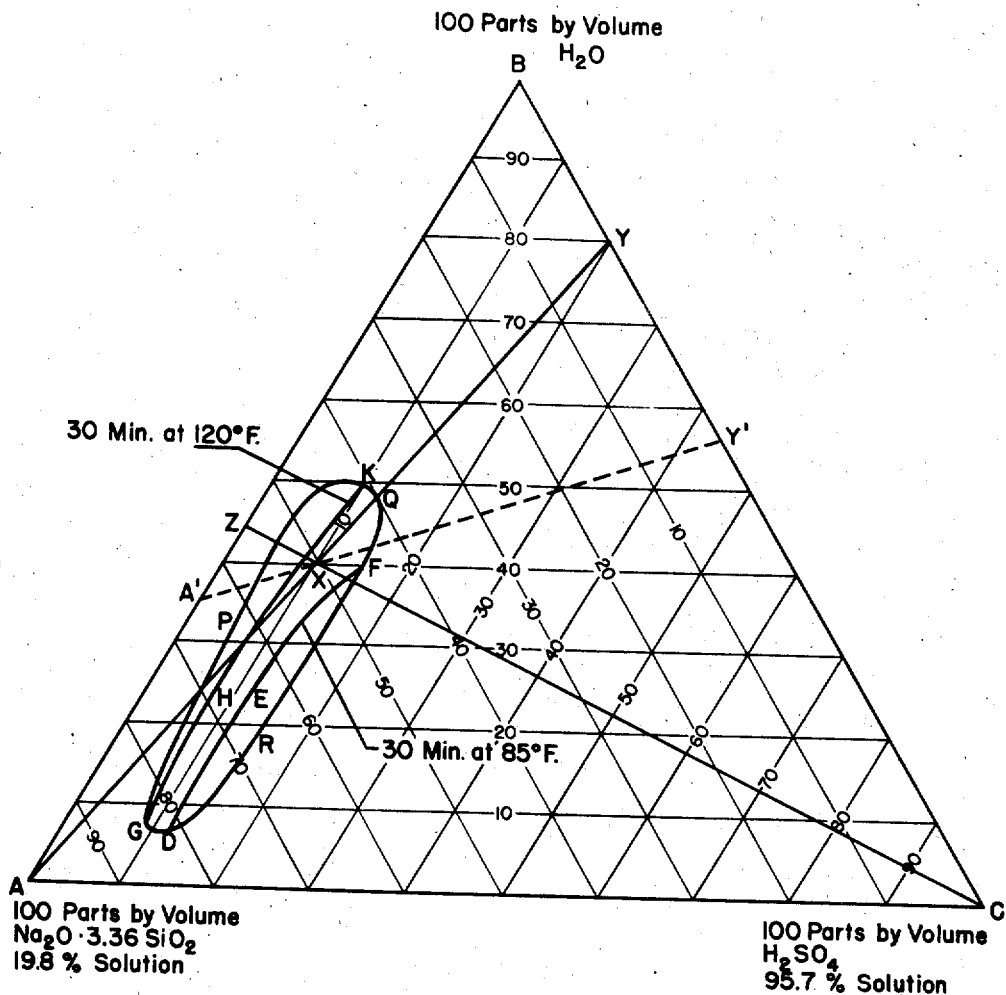

In the said drawings, Fig. 1 is a graph illustrating proportions in which an alkali metal silicate, an acid sulphate, and water may be mixed together to form a sealing solution for use according to the invention.

Figure 2:
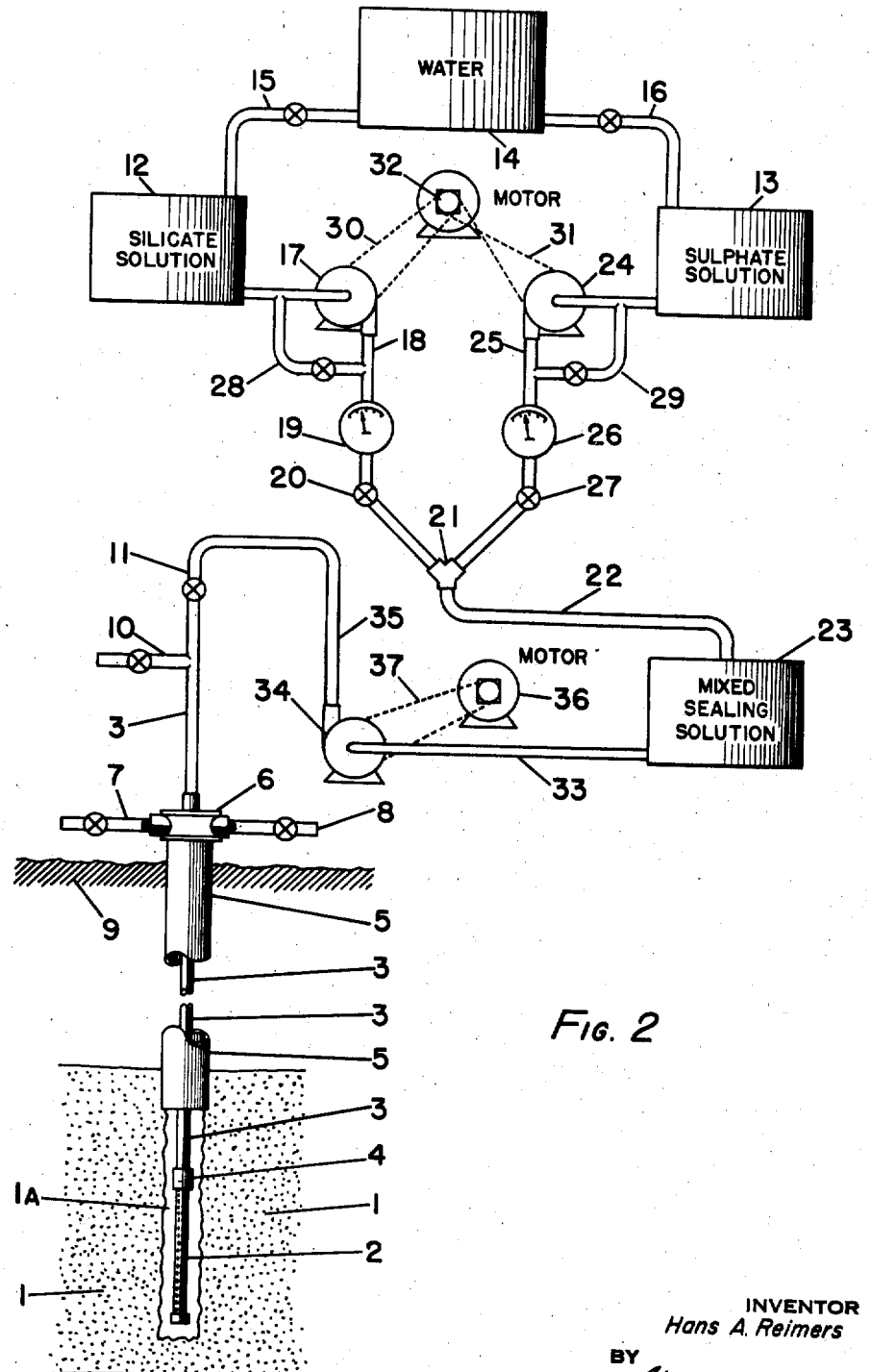

Fig. 2 is a schematic diagram illustrating the method of preparing the sealing solution and injecting the same into a deep well formation.

In carrying out the invention, two aqueous solutions are used, one comprising an alkali metal silicate and the other an acid sulphate. These two aqueous solutions are brought together in such manner and under such conditions as I have found are required to form a single aqueous sealing solution which remains temporarily in a state of incipient gel formation and in this state is capable of being injected through a deep well bore into the geological formation, the pores of which are to be sealed against fluid flow so as to render the formation fluid impermeable.

In compounding the aqueous alkali metal silicate solution, I prefer to use sodium silicate in which the ratio of $SiO_2$ to $Na_2O$ is between about 2.5:1 and 4.5:1, and preferably in the order of 3.36:1. The amount of water with which I dilute the alkali metal silicate solution is chosen with particular reference to the nature of the formations to be treated because I have found that these ordinarily will admit only moderately dilute sealing solutions without applying excessive injection pressures. On the other hand, I have found that certain relatively dilute sealing solutions are unsuitable because the sealing effects produced therefrom are not always effective to resist the relatively great fluid pressures usually encountered in deep wells. I have found that when sodium silicate is used as the alkali metal silicate in which the ratio of $Na_2O$ to $SiO_2$ is approximately 1:3.33, for example, a suitable concentration is less than about 25 per cent but not less than about 8 per cent and preferably between about 9 and 13 per cent by weight for the usual deep well formations. Similar concentrations may be used with other silicates of soda having ratios of $Na_2O:SiO_2$ in the specified range, although a ratio between 1:3 and 1:3.5 is preferred.

The acid sulphate solution may advantageously comprise sulphuric acid diluted, if necessary, so that its concentration will be in accordance with the ultimate proportion of water to be employed in the sealing solution, such concentration will usually fall in the range of about 9 to 98 per cent or more of $H_2SO_4$ in water by weight. The preferred concentration of the sulphuric acid to use is between about 6 and 20 per cent by weight in water for certain preferred compositions. The total amount of water will be between about 69 and 87 per cent of the total weight of the sealing mixture, the preferred total percentage of water being from 73 to 85. Other acid sulphates, such as sodium acid sulphate, may be used similarly.

In preparing the sealing solution of the type I have found to be suitable for sealing pores in deep well formations according to my invention, it is desirable to make reference to a conventional trilateral graph, as in Fig. 1, to represent the proportions of the three ingredients, alkali metal silicate, acid sulphate and water because these are interrelated and largely determine the length of time the sealing solution will remain liquid or pumpable before setting or gelation occurs, and this time interval in turn fixes the period during which injection into the well usually can be completed. In addition, as will be apparent hereinafter, I have found that for each particular concentration of silicate solution there is a proper corresponding concentration of acid sulphate solution to employ giving sealing compositions capable of setting or congealing into firm gels sufficiently strong to resist displacement from deep well formations.

The said Fig. 1 is a trilateral diagram or graph in which are plotted the relative proportions by volume of a solution of sodium silicate, water, and sulphuric acid, the latter as an illustration of an acid sulphate solution to produce sealing solutions for use according to the invention.

Referring now more specifically to Fig. 1, the corners A, B, and C of the diagram represent respectively 100 per cent by volume of each of the three liquids: sodium silicate solution containing 19.8 per cent by weight of sodium silicate in which the ratio of $Na_2O:SiO_2$ is 1:3.36; water; and sulphuric acid solution containing 95.7 per cent of $H_2SO_4$ by weight. The perpendicular distance from each of the sides of the triangle to any given point within the triangle then gives the relative proportions of the three liquids in per cent by volume of the composition represented by the given point. For example, the point X represents a composition containing 50 parts by volume of sodium silicate solution containing 19.8 per cent by weight of sodium silicate, 10 parts by volume of sulphuric acid solution containing 95.7 per cent by weight of sulphuric acid, and 40 parts by volume of water exclusive of that already present in the silicate solution and the sulphuric acid solution respectively used in making the composition X. Other points within the triangle may be read in similar manner, reference being made to the amount of the perpendicular distance from the point in question to the side of the triangle opposite the apex at which the particular liquid ingredient is represented to give the composition of the solution in parts by volume.

In the diagram, the closed curve PQR encloses an area representing fluid sealing compositions formed from sodium silicate, sulphuric acid and water which, when injected into the formations contiguous to oil and gas wells, are capable of setting or congealing in situ after a predeterminable length of time into sufficiently strong gels to resist displacement even when subjected to the comparatively great fluid pressures often encountered in such formations. Their sealing effect may be used for oil or gas as well as water or brine. The relative proportions of the ingredients to form the sealing compositions generally included in the area designated by the curve PQR are: sodium silicate solution (19.8 per cent concentration by weight 40 to 84 parts by volume, sulphuric acid solution (95.7 per cent concentration by weight) 3 to 14 parts by volume and water 6 to 50 parts by volume, the sum of the individual parts being 100. The range of proportions of the ingredients, for example, may be given also in parts by weight of each constituent anhydrous material in the mixed sealing solution as: 8 to 16 per cent sodium silicate (anhydrous), 4.7 to 20.5 per cent of sulphuric acid (96 per cent), the balance being water. Inasmuch as the materials comprising the constituents of the sealing composition are usually available as liquids and preferably best handled as such it is more convenient to use parts by volume to express the proper proportions as already indicated.

Within the composition area PQR, the curves DF and GK illustrate compositions all of which on the same curve remain pumpably fluid for substantially equal periods of time. The duration of the pumpable state varies for each composition throughout the area PQR and with the temperature. In general, the higher the temperature the more rapidly the compositions set into gels. For example, the compositions on the curve DF which set in about 30 minutes at 85° F. set in much less time at higher temperatures and compositions on the curve GK which set in about 30 minutes at 120° F. remains fluid for a longer time at lower temperatures.

The data given in the following Tables I and II, respectively, supplements that given within the curve PQR of Fig. 1 and includes data relative to the compressive strengths of the sealing compositions after having been allowed to set alone in test tubes at the temperature shown.

*Table I*

| Sealing solution composition in parts by volume | | | Minutes duration of pumpable state | | | | Set strength in grams | | | |
|---|---|---|---|---|---|---|---|---|---|---|
| $Na_2O$: 3.37 $SiO_2$ 19.8% solution | $H_2O$ | $H_2SO_4$ 96.6% solution | 50° F. | 85° F. | 120° F. | 190° F. | 50° F. | 85° F. | 120° F. | 190° F. |
| 50 | 47 | 3 | 6,670 | 1,390 | 310 | 19 | 20 | 230 | 273 | 131 |
| 50 | 46 | 4 | 2,760 | 840 | 240 | 31 | 188 | 276 | 208 | 176 |
| 50 | 44 | 6 | 775 | 190 | 80 | 18 | 344 | 319 | 319 | 177 |
| 50 | 42 | 8 | 350 | 100 | 35 | 8 | 264 | 340 | 359 | 113 |
| 50 | 40 | 10 | 160 | 46 | 17 | 4 | 273 | 431 | 144 | 115 |
| 50 | 38 | 12 | 64 | 24 | 9 | 2½ | 364 | 394 | 150 | 146 |
| 50 | 36 | 14 | 33 | 13 | 6 | 1½ | 404 | 437 | 380 | 123 |
| 60 | 37 | 3 | 0 | 0 | 0 | 0 | ----- | ----- | ----- | ----- |
| 60 | 36 | 4 | 2,560 | 640 | 180 | 17 | 372 | 668 | 197 | 244 |
| 60 | 34 | 6 | 630 | 190 | 70 | 14 | 715 | 885 | 621 | 244 |
| 60 | 32 | 8 | 210 | 75 | 28 | 7 | 893 | 1,040 | 165 | 245 |
| 60 | 30 | 10 | 90 | 32 | 12 | 3 | 989 | 1,153 | 1,041 | 203 |
| 60 | 28 | 12 | 42 | 16 | 7 | 2 | 1,300 | 1,289 | 1,041 | 214 |
| 60 | 26 | 14 | 14 | 8 | 3½ | 1½ | 877 | 1,270 | 382 | 187 |

*Table II*

| Sealing solution composition in parts by volume | | | Minutes duration of pumpable state | | | | Set strength in grams | | | |
|---|---|---|---|---|---|---|---|---|---|---|
| $Na_2O$: 3.37 $SiO_2$ 19.8% solution | $H_2O$ | $H_2SO_4$ 96.6% solution | 50° F. | 85° F. | 120° F. | 190° F. | 50° F. | 85° F. | 120° F. | 190° F. |
| 70 | 27 | 3 | 0 | 0 | 0 | 0 | ----- | ----- | ----- | ----- |
| 70 | 26 | 4 | 2,626 | 541 | 101 | 6 | 181 | 421 | 629 | 242 |
| 70 | 24 | 6 | 512 | 170 | 59 | 12 | 322 | 593 | 760 | 231 |
| 70 | 22 | 8 | 171 | 59 | 22 | 5 | 1,092 | 620 | 923 | 290 |
| 70 | 20 | 10 | 64 | 24 | 10 | 3 | 1,140 | 296 | 832 | 250 |
| 70 | 18 | 12 | 25 | 10 | 4 | 1 | 473 | 410 | 842 | 196 |
| 70 | 16 | 14 | 9 | 4 | 2½ | ¾ | 1,810 | 923 | 994 | 373 |
| 80 | 17 | 3 | 0 | 0 | 0 | 0 | ----- | ----- | ----- | ----- |
| 80 | 16 | 4 | 0 | 0 | 0 | 0 | ----- | ----- | ----- | ----- |
| 80 | 14 | 6 | 333 | 115 | 42 | 9 | 827 | 1,335 | 344 | 342 |
| 80 | 12 | 8 | 124 | 45 | 18 | 5 | 1,257 | 1,801 | 427 | 315 |
| 80 | 10 | 10 | 48 | 17 | 7 | 2 | 1,478 | 1,885 | 542 | 401 |
| 80 | 8 | 12 | 16 | 7 | 4 | 1½ | 387 | 1,864 | 870 | 967 |
| 80 | 6 | 14 | 0 | 0 | 0 | 0 | ----- | ----- | ----- | ----- |

Referring to the tables, the first three columns of each give the compositions of the sealing solution in parts by volume of the three liquids, viz. 19.8 per cent solution of sodium silicate having the formula $Na_2O;3.37\ SiO_2$, water, and 96.6 per cent sulphuric acid used to make the composition. The next four columns give the time in minutes that each sealing composition correspinding to those given in the first three columns remains in a pumpable state for the temperature at the head of the columns. The next four columns give the firmness or strength at the four temperatures 50, 85, 120, and 190° F. of the set or congealed sealing mixtures having the compositions set forth in the first three columns. The strength figures given are the pressure in grams required to be exerted upon the squarely cut off end of a $\frac{1}{16}$ inch diameter rod to force it 2 inches into the set sealing composition.

For the preparation and injection of the sealing solution, reference is had to Fig. 2 in which there is shown in elevation an oil well partly in section and penetrating a formation 1 to be sealed. Opposite the formation 1 in the well hole 1A is a perforated section of pipe 2 closed at its lower end and attached to the tubing 3 by a coupling 4. The tubing 3 is shown extending up through the well casing 5 to above the casing head 6 which is provided with valved pipe connections 7 and 8 communicating with the annular space in the casing 5. The surface of the ground above which the casing 5 extends is indicated at 9. The tubing 3 above the casing head 6 is provided with valved connections 10 and 11 through which fluids may be passed into or from the tubing 3.

Again referring to Fig. 2 apparatus is shown for preparing the sealing solution and making an injection of it into the formation 1. The apparatus shown comprises a tank 12 for preparing the diluted alkali metal silicate solution and a similar tank 13 for preparing the diluted acid sulphate solution. Water tank 14 is provided for delivering dilution water through valved pipes 15 and 16 to the silicate and sulphate tanks 12 and 13, respectively. Tank 12 is piped to the pump 17, the discharge 18 of which passes through the flow meter 19, valve 20, mixing Y 21, and thence through pipe 22 to the tank 23. Tank 13 is similarly piped to the pump 24, the discharge 25 of which passes through the flow meter 26, valve 27, mixing Y 21 and thence through pipe 22 to the tank 23. Each pump 17 and 24 is provided with a valved by-pass 28 and 29, respectively, which regulates its discharge rate. Each pump 17 and 24 is driven by driving means 30 and 31, respectively, from a common driving shaft 32 so as to be operated in unison. Tank 23 for holding the mixed sealing solution is connected by the pipe 33 to the pump 34, the discharge of which is connected by pipe 35 to the valved connection 11 on the well tube 3. A motor 36 is provided for driving the pump 34 through driving means 37.

In preparing the well for the injection of the sealing solution, I have found that it is usually desirable and in some instances necessary to wash the well hole with water to clear it of foreign substances which might affect the gelling or setting characteristics of the sealing solution. In some instances, it is necessary to use acidulated water or an acid solution for this washing operation as described in my Patent No. 2,207,759. The washing liquid may be introduced into the well hole under pressure through the valved connection 10 of Fig. 2, and allowed to rise in the annular space in the casing 5, valved connection 11 meanwhile being closed. Then by introducing gas or air into the annular space through either valved connection 7 or 8 while valved connection 10 is open the spent washing liquid may be displaced from the well through tubing 3 and valved connection 10. In connection with this washing operation, it is desirable to ascertain the rate at which water can be injected into the formation as this information may be used as an indication of the rate at which the sealing solution can be injected. This rate can be ascertained by employing tank 23 to hold a known volume of water and pumping it therefrom by pump 34 through pipes 33 and 35 at a measured rate into the well through valved connection 11 while the other connections on the well are closed.

Prior to making the injection, it is generally desirable to ascertain the extent of the formation to be sealed and its porosity or ability to absorb liquid, as by reference to the drilling log of the well, core samples, and geological data. From this data, the probable volume of sealing solution needed to impregnate the formation for a sufficient distance away from the well hole can be calculated. I have found that in relatively dense formations from about 1 to 3 feet depth of penetration of the solution is usually sufficient. In relatively open formations as much as 10 to 20 feet of penetration may be required. A generally useful rule for determining the volume of solution to be used is to calculate from the data obtained as indicated above the aggregate volume of voids in the portion of the formation to be impregnated and then inject therein from 3 to 6 times as much sealing solution as corresponds to the so-calculated aggregate volume of void space.

Having ascertained the probable volume of sealing solution required and the rate at which water can be injected into the formation, the time required for the injection of the sealing solution may be calculated on the basis of the water injection rate. The time thus calculated to be required determines in part the composition to be selected from those set forth in the area PQR and further detailed in Tables I and II. It is preferable to select a sealing solution composition, the pumpable state of which exceeds the time corresponding to that calculated to be required for its injection, which time should be reckoned from the instant the silicate solution and the acid sulphate solution come together at Y 21.

The required amount of silicate solution may be prepared in tank 12, Fig. 2, as by diluting commercial sodium silicate or water glass with water from tank 14 to a concentration corresponding to a point along the side AB of the triangle of Fig. 1 such that a straight line drawn from the point will pass through the composition point selected within the area PQR and also intercept the side BC of the said triangle. The required amount of acid sulphate solution may be prepared in tank 13 by diluting commercial (concentrated) sulphuric acid with water from tank 14. The dilution or concentration of the acid should be that corresponding to the point on the side BC of the triangle, Fig. 1, intercepted by the straight line referred to above drawn through the point representing the concentration of the silicate solution and that of the sealing solution. The silicate solution from tank 12 and the sulphuric acid solution from tank 13 are then delivered by their respective pumps 17 and 24 through the flow meters 19 and 26, respectively, to the mixing Y 21 and thence together through pipe 22 which completes the mixing before the mixed sealing solution is discharged into tank 23. The two solutions are preferably mixed rapidly and this effect can be obtained readily by the means shown although other mixing devices may be used. In carrying out such mixing operation, I have found it to be advantageous and generally necessary to control the respective discharge rates of the pumps 17 and 24 so that the ratio of the rate of flow of silicate solution to that of the acid sulphate solution is maintained substantially constant, such ratio being ascertainable by reference to the graph. For example, for a sealing composition X, the ratio of the rate of flow of the silicate solution to that of the acid sulphate solution corresponds to the ratio of the two lengths into which the line intercepting both sides of the triangle and passing through the point X is divided by the point X.

The constancy of the ratio in which the two solutions are mixed is assured and maintained by driving the pumps 17 and 24 in unison and adjusting the by-pass 28 and 29, respectively, in conjunction with valves 20 and 27, so that the desired rates of flow of each solution is obtained. By means of the arrangement of pumps and valves in connection therewith as shown the rate of production of the mixed sealing solution discharge into tank 23 can be varied as by varying the driving rate of shaft 32 from which both pumps 17 and 24 are driven.

As the silicate solution from tank 12 and the acid sulphate solution from tank 13 come together in the proper ratio in the mixing Y 21, mixing occurs and continues to completion in pipe 22 from which the mixture is discharged into tank 23 ready for immediate injection into the well formation.

The mixed sealing solution is pumped from tank 23 preferably as rapidly as available through pipes 33 and 35 into the well tube 3 by means of pump 34 actuated by motor 36 through driving means 37 and is discharged through the perforations of perforated pipe 2 into the well hole 1A from which it passes into the formation 1. By this arrangement, the rate of injection of the mixed sealing solution may be varied as required by varying the driving rate of either the pump or that of the pumps 17 and 24. During the injection valved connections 7, 8 and 10 will usually be closed although, and if desired, a hydrostatic pressure may be maintained in the space in the casing 5 outside the tube 3 as by introducing a pressuring fluid such as oil into the said space through either the valved connection 7 or 8 which communicates with it. After the sealing solution has been injected into the well formation, the tubing 3 may be flushed and then pressure may be maintained upon the sealing solution so as to prevent its return from the formation until setting is complete.

In some instances, it may be desirable to introduce into the well formations more than one composition of sealing solution in order to reduce the amount required or to facilitate retaining injected sealing solution in the formation until setting is completed. This may be accomplished by varying the rate of flow of the silicate solution relative to that of the acid sulphate solution during the compounding and injection of the sealing mixture. I have found, that by adjusting the relative proportions of the two solutions so as to form a single sealing solution having a fluid state of relatively long duration for the first portion of the sealing solution to be injected and then changing the relative proportions as the injection proceeds so as to form and inject a sealing composition having a shorter period of fluidity during the later stages of the injection, the tendency for the sealing solution to be displaced is materially reduced. In addition, the duration of the period over which it may be necessary to maintain pressure upon the sealing solution in the formation while setting is also reduced. There is also the further advantage that less sealing solution is used because congelation soon occurs preventing excessive drainage into the formation.

I claim:

1. The method of sealing a deep well formation which comprises injecting into the formation a fluid aqueous mixture comprising by weight from about 8 to 16 per cent of sodium silicate and from 4.7 to 20.5 per cent of sulphuric acid.

2. The method of sealing a deep well formation which comprises injecting into the formation a fluid aqueous mixture comprising by weight from about 8 to 16 per cent of sodium silicate having a ratio of $Na_2O$ to $SiO_2$ between 1:3 and 1:3.5 and from about 4.7 to 20.5 per cent of sulphuric acid.

HANS A. REIMERS.